(12) United States Patent
Meyer (10) Patent No.: US 6,378,047 B1
(45) Date of Patent: *Apr. 23, 2002

(54) SYSTEM AND METHOD FOR INVALIDATING SET-ASSOCIATIVE CACHE MEMORY WITH SIMULTANEOUS SET VALIDITY DETERMINATION

(75) Inventor: James W. Meyer, Shoreview, MN (US)

(73) Assignee: Micron Technology, Inc., Boise, ID (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/888,501

(22) Filed: Jul. 7, 1997

(51) Int. Cl.[7] ............................................. G06F 12/00
(52) U.S. Cl. ...................................................... 711/135
(58) Field of Search ................................. 711/121, 136, 711/144, 158, 128, 135

(56) References Cited

U.S. PATENT DOCUMENTS

| | | | |
|---|---|---|---|
| 4,638,431 A | 1/1987 | Nishimura | 711/144 |
| 4,821,171 A | 4/1989 | Calamari | 711/207 |
| 5,333,296 A | 7/1994 | Bouchard et al. | 711/171 |
| 5,479,630 A | 12/1995 | Killian | 711/3 |
| 5,506,967 A | 4/1996 | Barajas et al. | 711/118 |
| 5,535,358 A | 7/1996 | Kimura et al. | 711/118 |
| 5,537,609 A | 7/1996 | Whittaker et al. | 711/119 |
| 5,537,640 A | 7/1996 | Pawlowski et al. | 711/146 |
| 5,550,995 A | 8/1996 | Barrera et al. | 711/3 |
| 5,553,259 A | 9/1996 | Kalish et al. | 711/3 |
| 5,553,263 A | 9/1996 | Kalish et al. | 711/127 |
| 5,579,503 A | 11/1996 | Osborne | 711/119 |
| 5,638,534 A | * 6/1997 | Mote, Jr. | 711/158 |
| 5,778,433 A | * 7/1998 | Collins et al. | 711/135 |
| 5,787,468 A | * 7/1998 | Clark | 711/121 |
| 5,809,528 A | * 9/1998 | Miller et al. | 711/136 |
| 5,809,536 A | * 9/1998 | Young et al. | 711/144 |
| 5,829,030 A | * 10/1998 | Ishida et al. | 711/135 |
| 5,845,325 A | * 12/1998 | Loo et al. | 711/135 |
| 5,845,326 A | * 12/1998 | Hirayama et al. | 711/135 |

OTHER PUBLICATIONS

Handy, Jim; The Cache Memory Book; 1993; pp. 49–60.*
Intel; Pentium Processors and Related Products; 1995, pp. 1-1 and 1-2.*
Intel; Intel Architecture Optimization Manual; 1997, pp. 1-1 through 2-9.*

* cited by examiner

Primary Examiner—David L. Robertson
(74) Attorney, Agent, or Firm—Knobbe, Martens, Olson & Bear, LLP (57) ABSTRACT

A system and process for invalidating addresses within a cache memory system is described. The system and process allow a set-associative cache memory system in a computer to simultaneously analyze all sets corresponding to a particular address to determine whether the data at a particular address needs to be written back to the computer's main memory. A set of flags is stored with each address in the cache memory so that the flags can be scrutinized to determine whether the data stored in that set is valid, but not modified.

9 Claims, 8 Drawing Sheets

SYSTEM AND METHOD FOR INVALIDATING SET-ASSOCIATIVE CACHE MEMORY WITH SIMULTANEOUS SET VALIDITY DETERMINATION

BACKGROUND OF THE INVENTION

1. Field of the Invention

This invention relates to electronic circuits within a computer system. More specifically, this invention relates to systems and methods for invalidating cache memory within a computer system.

2. Description of the Related Art

Modern computer systems use a memory hierarchy to maximize their performance. This type of hierarchy exists so that the computer system can simultaneously store large amounts of data and provide rapid access to that data for the consumer. In current computer systems, the memory hierarchy resides within three stages. The first memory stage is designed to permanently store large amounts of data, and is normally provided by a magnetic disk or CD-ROM. The second memory stage is usually called "main memory" and is normally provided by 16, 32, 64 or more megabytes of dynamic random access memory (DRAM). The second stage of memory holds data and program information while the computer system is turned on. However, the main memory area is normally erased once power is removed from the computer.

The third stage of memory is a cache memory system. The cache memory system normally resides between a host processor and the main memory. In some cases, such as with an Intel® Pentium® Pro processor, portions of the cache memory system are incorporated into the host processor. Most cache memory systems are made up of static RAM which has a very fast access time. Static RAMs with 15, 20 or 25 nanosecond access times or faster are currently available. In use, blocks of the main memory are copied into the static RAM of the cache memory. When the host processor requires data or program instructions from main memory, it normally first checks the cache memory for that data. If the requested data is found within the cache memory, then the processor retrieves the data without having to access the slower main memory. Because most processors access data segments that reside near each other sequentially, one block of cache memory may hold the required data for several processor requests.

One challenge in designing a cache memory system is the maintenance of cache coherency between the main memory and the cache memory. For example, when a block of data is updated in the cache memory, the same address in the main memory must also be eventually updated. One mechanism for providing cache coherency involves storing "valid" and "modified" flags with every address in the cache memory. These flags are usually single bits that help the computer system identify addresses in the cache memory which have been updated, but not written back to the main memory.

As one example, the processor may write a new piece of data into an address in the cache memory and then mark that address as both valid and modified by setting the valid and modified bits to a one. A memory controller within the computer system can then determine that this particular address in cache memory holds valid data from the processor that has been modified, but not written back to the main memory. Once the memory controller writes the data from the cache memory to the main memory, the modified bit is set to a zero to indicate that the data block at this location in cache has been written back to the main memory.

Cache memory systems are normally organized into blocks, called cache lines, with each line typically containing 16, 32, 64 or 128 bytes of consecutive memory locations. A cache controller manages the cache memory and intercepts the read and write signals going to the main memory from the processor. For example, if the processor attempts a memory read operation, the cache controller first checks the desired memory address against a list of current addresses within the cache memory system to determine if the desired address has already been stored in the cache. If the memory address is found within the cache, the requested data is immediately sent from the fast cache memory to the processor, normally with zero wait states. If the cache memory does not contain data at the desired address, the cache controller reads the requested memory block from the main memory into a cache line in the cache memory system and passes the requested data to the CPU.

Although the CPU must wait for the cache controller to fill a cache line from the main memory, addresses located next to the requested address will be loaded into the cache system and thereby be available to the processor should it desire any of these addresses. As discussed above, many processors gather data from segments that are very near the previously read segment.

Various cache schemes have been designed to efficiently transfer data from the main memory to the processor. One cache memory scheme is a set-associative cache, and is known to efficiently manage memory requests from the processor. In this system, the cache controller stores a given memory block in any one of several cache lines. Each of these cache lines is known as a set. Thus, these types of cache systems, wherein the memory block is stored in either of two cache lines is called a two-way set-associative cache.

As discussed above, the host processor marks specific addresses as valid or modified within the cache memory system in order to maintain cache coherency. In addition, it is sometimes necessary for the host processor to "flush" the cache by invalidating every address within the cache system. Some host processors, such as the Intel® Pentium® Pro processor, provide a FLUSH signal interface to the cache controller for just this purpose. However, prior to invalidating each address within the cache, the processor must first determine if any data needs to be written back to the main memory.

Modified, but not written back data, is first copied to the main memory during a FLUSH cycle. As discussed above, the Intel® Pentium® and Intel® Pentium® Pro processors include a FLUSH signal on their host interface. If the FLUSH signal is asserted, the Pentium® or Pentium® Pro processor writes back all of the internal cache lines that have modified data to the main memory. In addition, each address in the cache memory system is invalidated. This operation puts all internal cache lines into the invalid state. This process is used, for example, when the system is shutting down to ensure that all data within the cache system has been written to the main memory. However, current systems do not perform these flush cycles efficiently, thus leading to a slower overall computer performance.

Various systems have been designed in the prior art for invalidating the cache memory during a flush cycle. For example, some systems perform a flush cycle by reading the first address in the cache, determining whether that data has been modified, writing any modified data back to main memory, and then invalidating that address. The process then moves sequentially to the next address within the cache memory and repeats. When this type of flush process begins in computers with a set-associative cache memory system, each address in every set is analyzed individually to determine whether the data in that particular address has been modified, but not written back to the main memory. Because each set in the cache system is analyzed sequentially, these systems perform the FLUSH cycle very inefficiently.

Due to the aforementioned limitations in prior systems, the technology needs a method and system for efficiently invalidating multiple addresses within a memory cache. What is also needed in the technology is a mechanism responsive to a signal from a computer processor for efficiently invalidating every address within the computer system's cache memory.

SUMMARY OF THE INVENTION

One embodiment of the invention is a set-associative cache memory system in communication with a computer processor and main memory. The cache memory system includes cache tag memory and cache data memory. The cache memory system includes: a counter for outputting an address to be invalidated in the cache memory; an update circuit in communication with the cache tag memory for simultaneously determining whether any set in the set-associative cache memory corresponding to the address contains data that has not been written back to the main memory; and a write-back circuit responsive to the update circuit for writing data from the cache data memory to the main memory.

Another embodiment of the invention is a tag update system in a computer for invalidating memory locations in a set-associative cache memory, wherein the computer includes a cache memory, a main memory and a processor. The tag update system includes: a counter for selecting a first address to invalidate; a first flag associated with the first address and indicative of when the first address contains data that has been changed but not written back to the main memory of the computer; a second flag associated with the first address and indicative of whether the first address is valid; and a circuit in communication with the first flag and the second flag for simultaneously determining whether each set associated with the first address refers to an address containing valid and modified data.

Still another embodiment of the invention is a cache controller for a computer system, wherein the computer system has a processor, a set-associative cache memory and a main memory. The cache controller includes: a counter for outputting a first address to be invalidated in the cache memory; an update circuit in communication with the cache memory for simultaneously determining whether any set in the set-associative cache memory corresponding to the first address contains data that has not been written back to the main memory; and a write-back circuit responsive to the update circuit for writing data from the cache data memory to the main memory.

Yet another embodiment of the invention is within a computer system having a set-associative cache memory and a main memory. This embodiment is a process for invalidating addresses in the cache memory, including: a) outputting an address to be invalidated in the cache; b) interrogating each set corresponding to the address simultaneously to determine whether any set contains data that needs to be written to the main memory prior to invalidating the first address; c) selecting a first set of data from a set that needs to be written back to the main memory; d) writing the selected set of data to the main memory; and e) invalidating the address in the cache memory.

A further embodiment of the invention is a process in a computer having a processor, main memory and set associative cache memory. The process performs a flush operation to invalidate each address in the cache memory, including: a) generating an address to invalidate in the cache memory; b) determining whether the data stored at the address in the cache memory has not been written back to the main memory by simultaneously determining whether each set corresponding to the address has not been written-back to the main memory; c) writing data from each set that has not been written-back to the main memory; d) invalidating the address once the data is written-back to the main memory; e) generating a next address to invalidate; and f) repeating b) through e) until all addresses in the cache memory have been invalidated.

An additional embodiment of the invention is a cache controller for a computer system, wherein the computer system has a processor, a set-associative cache memory and a main memory. This embodiment includes: means for outputting a first address to be invalidated in the cache memory; means in communication with the cache memory for simultaneously determining whether any set in the set-associative cache memory corresponding to the first address contains data that has not been written back to the main memory; and means responsive to the update circuit for writing data from the cache data memory to said main memory.

DETAILED DESCRIPTION OF THE INVENTION

This invention relates to a system and process for invalidating data stored in the cache memory of a computer system. Normally, this process begins when a host processor asserts a signal instructing a cache controller to invalidate all of the addresses within a cache system. In one embodiment, an Intel® Pentium® Pro processor or Pentium® II may issue a FLUSH signal to a cache controller within a computer system to indicate that all cache memory addresses stored in the cache should be invalidated.

Once the cache memory system has received an instruction to invalidate all of the addresses within the cache memory system, the system first determines whether the data stored at each address has been written back to the main memory. The cache invalidation system described herein provides an efficient and advantageous mechanism for invalidating multiple sets of cache memory addresses within a computer that has a set associative cache memory scheme. The cache memory system described below provides these advantages by simultaneously investigating the valid and modified state of a plurality of sets corresponding to the address to be invalidated in the cache memory system. By investigating all sets corresponding to the invalidate address simultaneously, the cache invalidation system can invalidate a large portion of the cache memory in a short period of time.

Figure 1:
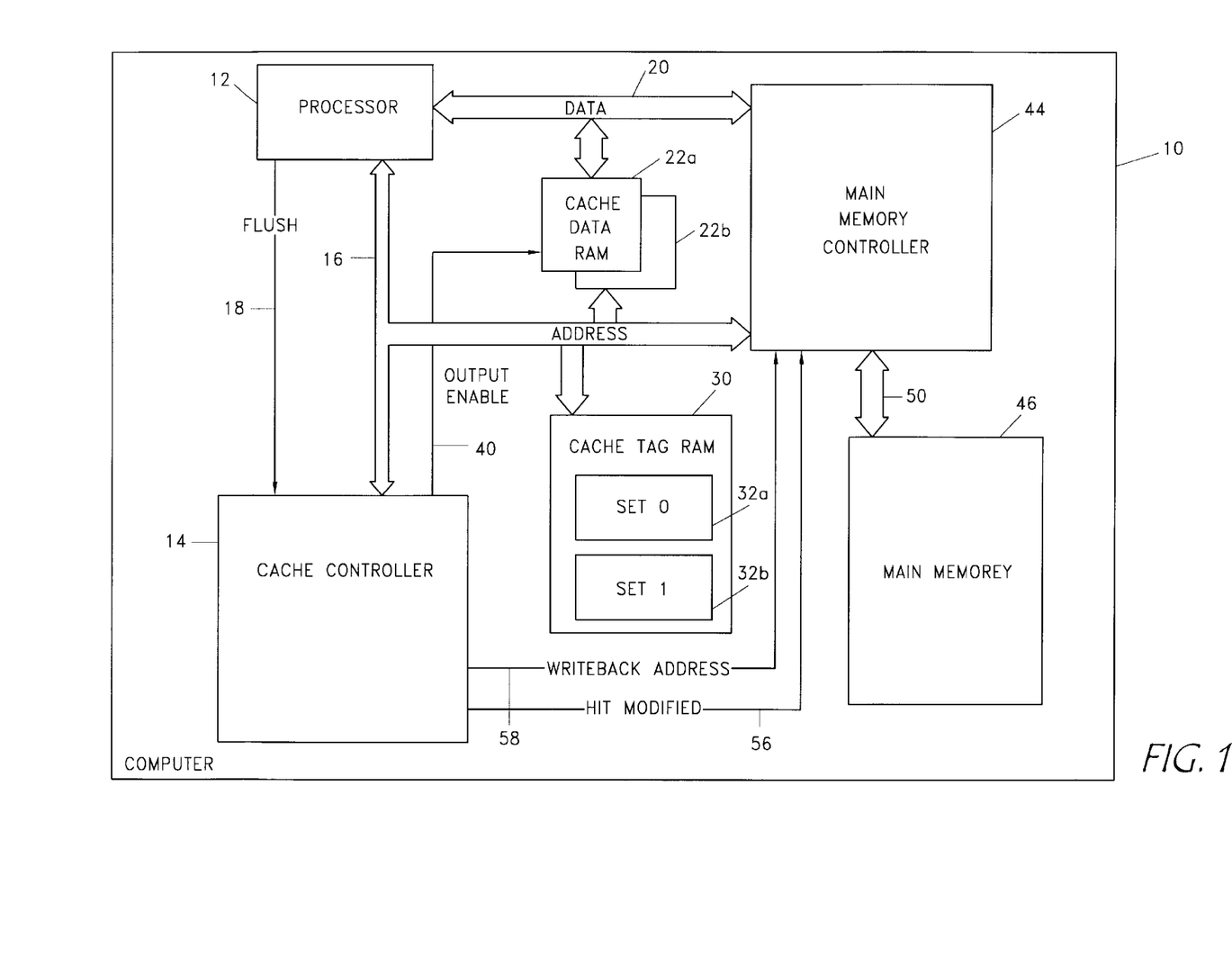
FIG. 1 is a block diagram illustrating a computer system which includes a processor, cache controller, main memory controller, main memory and cache memory system including a HIT MODIFIED signal.

Referring to FIG. 1, a computer 10 is shown having a processor 12 in communication with a cache controller 14 through an address bus 16. In one embodiment, the processor is an Intel® Pentium® processor and the cache controller is a VLSI Lynx system controller (VLSI Corporation). Other processors that assert a signal to invalidate every address in a cache memory system, such as those manufactured by AMD, Motorola, Digital Equipment Corporation, Cyrix and Texas Instruments are anticipated to work in conjunction with the tag invalidation system of the invention.

A FLUSH line 18 connects the processor 12 and the cache controller 14 so that they are in electronic communication. As will be described in more detail below, the FLUSH line 18 transmits a FLUSH signal from the processor 12 to the cache controller 14 to initiate a tag invalidation process within the cache memory system. It should be realized that the FLUSH signal may be made up of several separate hardware or software signals within the computer 10. These separate signals may translate into a single FLUSH signal.

The processor 12 is also in communication, through a set of data lines 20, with a series of a cache data random access memories ("cache RAMs") 22a–b. The cache data RAMs 22a–b can be made up of any high speed memory integrated circuit that can quickly store and retrieve data. Normally, these high speed memory integrated circuits are made up of static RAM memory chips such as those made by Toshiba, IDT, Hitachi, Samsung and others. Any type of high speed memory chip is anticipated to work in conjunction with the cache memory system of the invention.

As illustrated, the cache data RAMs 22a–b are also in communication with the processor 12 through the address bus 16. Thus, address and data information to and from the processor 12 can be transmitted from the cache data RAMs 22a–b across the data bus 20 and address bus 16. The address bus 16 also communicates with a series of cache tag RAMs 30. The cache tag RAM 30 includes two or more sets 32a–b of tag RAMs, as will be explained below. Similar to the cache data RAMs 22a–b, the cache tag RAMs can comprise any type of high speed memory. The cache tag RAM holds specific information, known as a "tag", relating to the data stored in the corresponding cache data RAMs 22a–b.

In the embodiment described in FIG. 1, two sets of cache tag RAM 32a–b are disclosed. However, the cache invalidation system can function within any set associative cache memory system. Therefore, cache memory systems with two, four, eight, sixteen or more sets of cache tag RAM are anticipated. The embodiment described in FIG. 1 is a two-way set associative cache memory. The data structure of the cache tag RAM 30 is described below in Table 1.

TABLE 1

Structure Of A Two-Way Set Associative Cache Memory

| Set | Address Tag | Modified | Valid |
|---|---|---|---|
| 0 | 00000011 01010111 | 1 | 1 |
| 0 | 00011101 11010011 | 0 | 0 |
| 1 | 01101000 11010001 | 0 | 0 |
| 1 | 11011100 00101101 | 1 | 1 |

In order for the cache controller 14 to select a particular address within the cache data RAM 22, an output enable line 40 communicates signals from the cache controller 14 to the cache data RAM 22. The output enable line 40 selectively enables particular addresses within the cache data RAM which thereafter strobe the data from the cache data RAM 22 onto the data bus 20 where it can be received by the processor 12.

Also in communication with the data bus 20 and address bus 16 is a main memory controller 44 which controls access to a main memory 46. A memory address bus 50 runs between the main memory controller 44 and main memory 46. Thus, when the processor 12 requests a piece of data from main memory 46, the actual address corresponding to that data is sent along the address bus 16 to the cache controller 14. The cache controller 14 determines whether the requested address is stored within the cache memory system by interrogating the cache tag RAM 30. If a matching address is found within the cache tag RAM 30, the cache controller 14 sends an output enable signal along the output enable line 40 to the cache data RAM 22a–b. The cache data RAM 22 thereafter outputs the data corresponding to the requested address along the data line 20 to the processor 12.

However, if the address requested by the processor 12 is not found within the cache tag RAM 30, then the cache controller 14 notifies the main memory controller 44 to retrieve the requested data from an address in main memory 46 through the memory address bus 50. Data corresponding to the requested address is sent from the main memory 46, via the main memory bus 50 and address bus 16, to the processor 12. In addition, a copy of the address and data information is sent via the address bus 16 to the cache tag RAM 30 and cache data RAMs 22 so that it can be stored and made available to the processor 12 in the future. The newly retrieved data from the main memory replaces older data stored in the cache data memory 22.

If the processor 12 asserts a FLUSH signal along the FLUSH line 18, then the cache controller 14 determines which address within the cache memory system needs be written back to the main memory 46 before being invalidated. As will be explained in more detail below, the cache controller 14 interrogates all sets within the cache tag RAM simultaneously to determine whether any valid, but modified addresses are stored in the cache tag RAM 30. If any cache memory set has a valid, modified address, then the cache controller 14 asserts a hit modified signal 56 to alert the memory controller 44 that data from the cache system will be written back to the main memory 46.

The address corresponding to the data which needs to be written back to the main memory 46 is sent along a write back address line 58 that connects the cache controller 14 and main memory controller 44. Once the memory controller 44 receives a write-back address from the write-back address line 58, it retrieves the data that is stored in that address in the cache data RAM 22. The cache data RAM sends the write-back data along the data line 20. The data retrieved from the cache data RAM 22 will then be written from the main memory controller 44 by placing it onto the memory address bus 50 of the main memory 46. This process is discussed in more detail in reference to FIG. 2.

Figure 2:
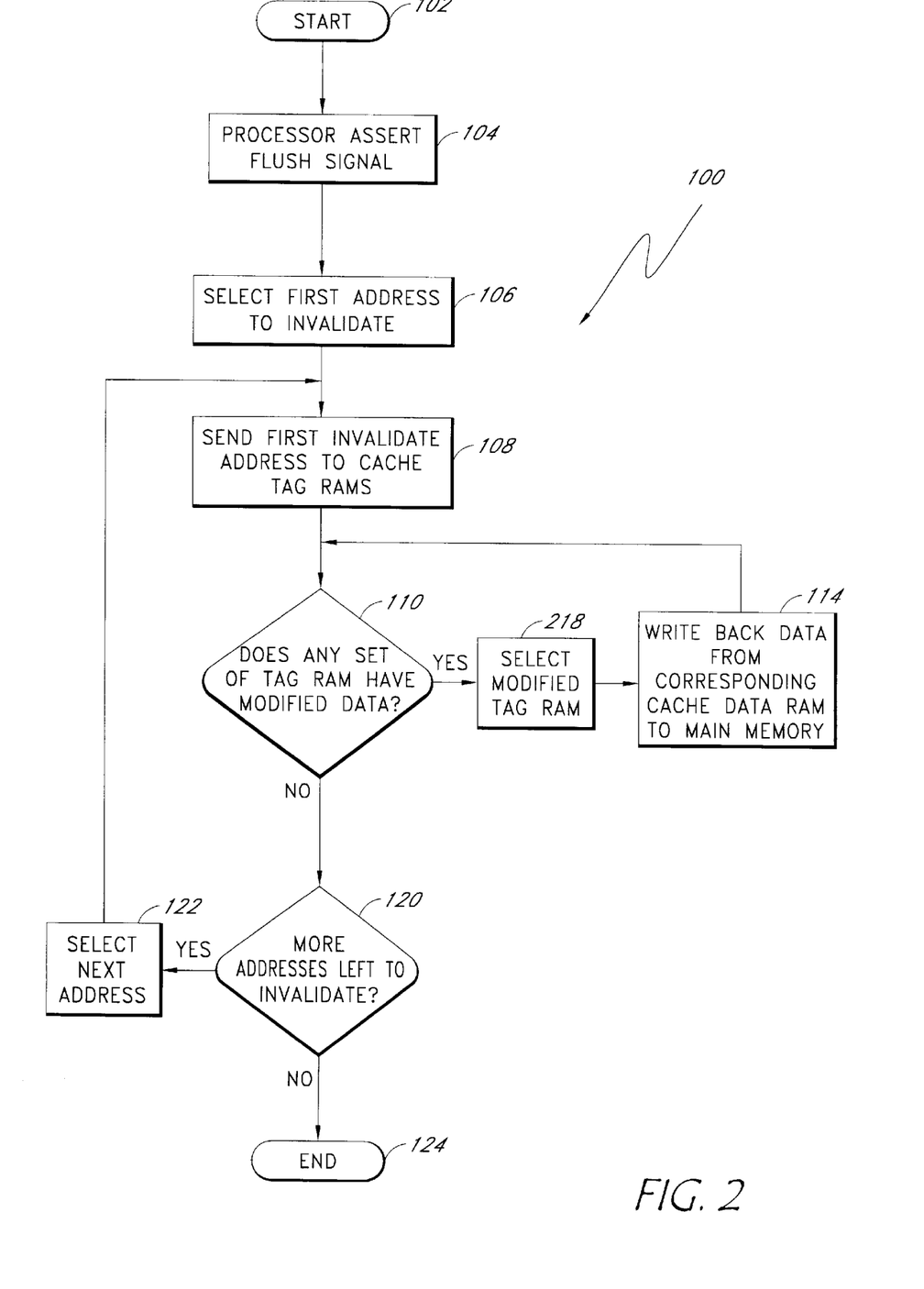
FIG. 2 is a flow diagram illustrating an overview of the cache memory invalidation system of the invention.

Referring now to FIG. 2, a flow diagram is shown illustrating an overview of one embodiment of the tag invalidation process 100. The process 100 begins at a start state 102 and then moves to a state 104 wherein the processor asserts a FLUSH signal. As discussed above, the FLUSH signal is generated by the processor to invalidate every address within the cache memory system. Once the FLUSH signal has been asserted at state 104, the first address to invalidate is selected at a state 106. The process of selecting the first address to invalidate will be discussed in more detail below in reference to FIGS. 5 and 7.

The process 100 then moves to a state 108 wherein the first invalidate address is sent from the cache controller 14 to the cache tag RAMs 30. After the cache tag RAMs have received the first invalidate address, an inquiry is made at a decision state 110 whether any set within the invalidate address contains modified data. It can be noted by reference to Table 1 that each tag RAM includes a modified bit indicating whether the data corresponding to the current tag has been modified, but not written back, to the main memory. If any set of tag RAM includes a modified bit indicating that there is modified data that has not been written back at the decision state 110 then the modified tag RAM is selected at a state 112. Once the modified tag RAM has been selected at the state 112, the data corresponding to the address held in the tag RAM is written back from the corresponding cache data RAM to the main memory at a state 114.

After the write-back data has been sent from the cache data RAM to the main memory at the state 114, the process 100 loops back to the decision state 110 wherein the process 100 inquires whether any other sets of tag RAM indicate that the cache memory system has modified data at the invalidate address. If no other sets of tag RAM indicate that the cache memory system has modified data at the invalidate address, then the process 100 moves to a decision state 120 wherein an inquiry is made whether more addresses are left to invalidate within the cache tag RAM. If more addresses are left to invalidate at the decision state 120, then the next address is selected at a state 122 and the process 100 sends the first invalidate address to the cache tag RAMs at the state 108. However, if there are no more addresses left to invalidate at decision state 120, the process ends at an end state 124.

Tag Invalidation Circuit

Figure 3:
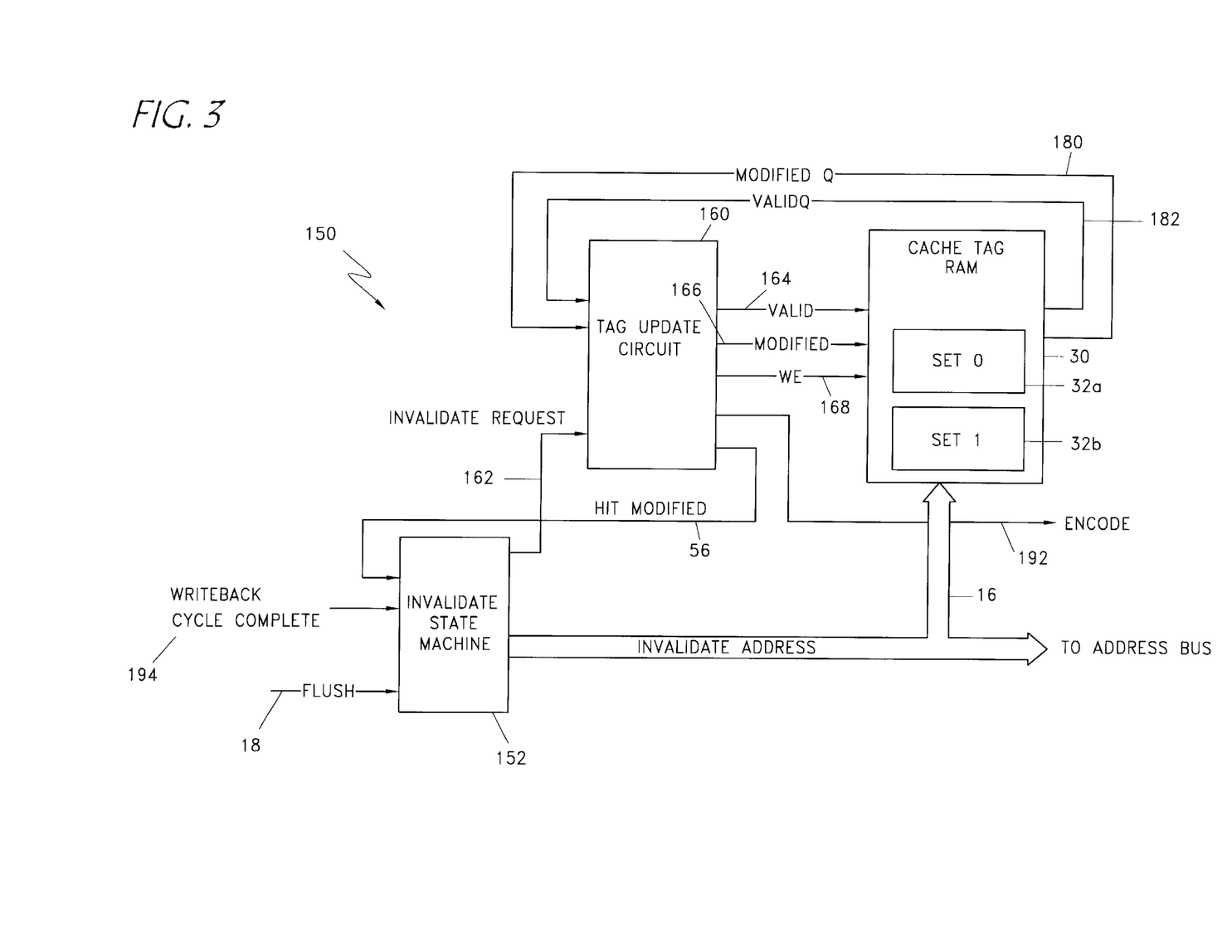
FIG. 3 is a block diagram illustrating the relationship of the tag update circuit, cache tag RAM and state machine in the cache memory invalidation system of the invention.

FIG. 3 provides a circuit diagram of one embodiment of a cache invalidation system 150. As shown, the three main components of the cache invalidation system 150 are an invalidate state machine 152, a tag update circuit 160, and the aforementioned cache tag RAM 30 (See FIG. 1). The invalidate state machine 152 and tag update circuit 160 are normally circuits within the cache controller 14 (FIG. 1) but could reside within any similar circuit in the computer system 10.

To initiate the tag invalidation system, a FLUSH signal is sent from the Processor 12 via the FLUSH line 18 into the invalidate state machine 152. As will be discussed in reference to FIG. 5, the invalidate state machine sequentially generates addresses to be invalidated within the cache tag RAM 30. For example, the invalidate state machine may output address zero on the address bus 16 along with a signal to invalidate that address on an invalidate request line 162. As shown, the invalidate request line 162 connects the invalidate state machine 152 to the tag update circuit 160. Thus, an incoming FLUSH signal on the flush line 18 may cause the invalidate state machine 152 to output address zero to the address bus 16 and simultaneously assert an invalidate request on the invalidate request line 162 to the tag update circuit 160.

Connecting the tag update circuit 160 to the cache tag RAM 30 is a valid line 164, modified line 166, and write enable line 168. As will be discussed in reference to FIG. 4, these lines are used to request for data corresponding to the modified and valid status of each address in the cache tag RAM be sent from the cache tag RAM 30.

Once signals representing an address to invalidate are sent along the address bus 16 from the invalidate state machine 152, a ModifiedQ line 180 and ValidQ line 182 carry MODIFIEDQ and VALIDQ signals from the cache tag RAM 30 to the tag update circuit 160 indicating whether the selected invalidate address contains modified or valid bits. If the invalidate address includes both modified and valid bits, then a HITMODIFIED signal and an ENCODE signal are generated on a HitModified line 56 and Encode line 192. The HITMODIFIED and ENCODE signals indicate that the address stored in the cache tag RAM 30 has been modified and not written back to the main memory. Once an address is written back to the main memory, then the write-back cycle complete line 194 is asserted. The write enable line 168 is then asserted to strobe in valid, but not modified data along the valid line 164 and modified line 166.

Through the tag invalidation system 150, each address in the cache tag RAM can be investigated for its modified and valid status. As will be shown in reference to FIG. 4, the tag invalidation system interrogates each set of the cache tag RAM simultaneously and therefore provides an efficient mechanism for invalidating every address within the cache memory.

Figure 4:
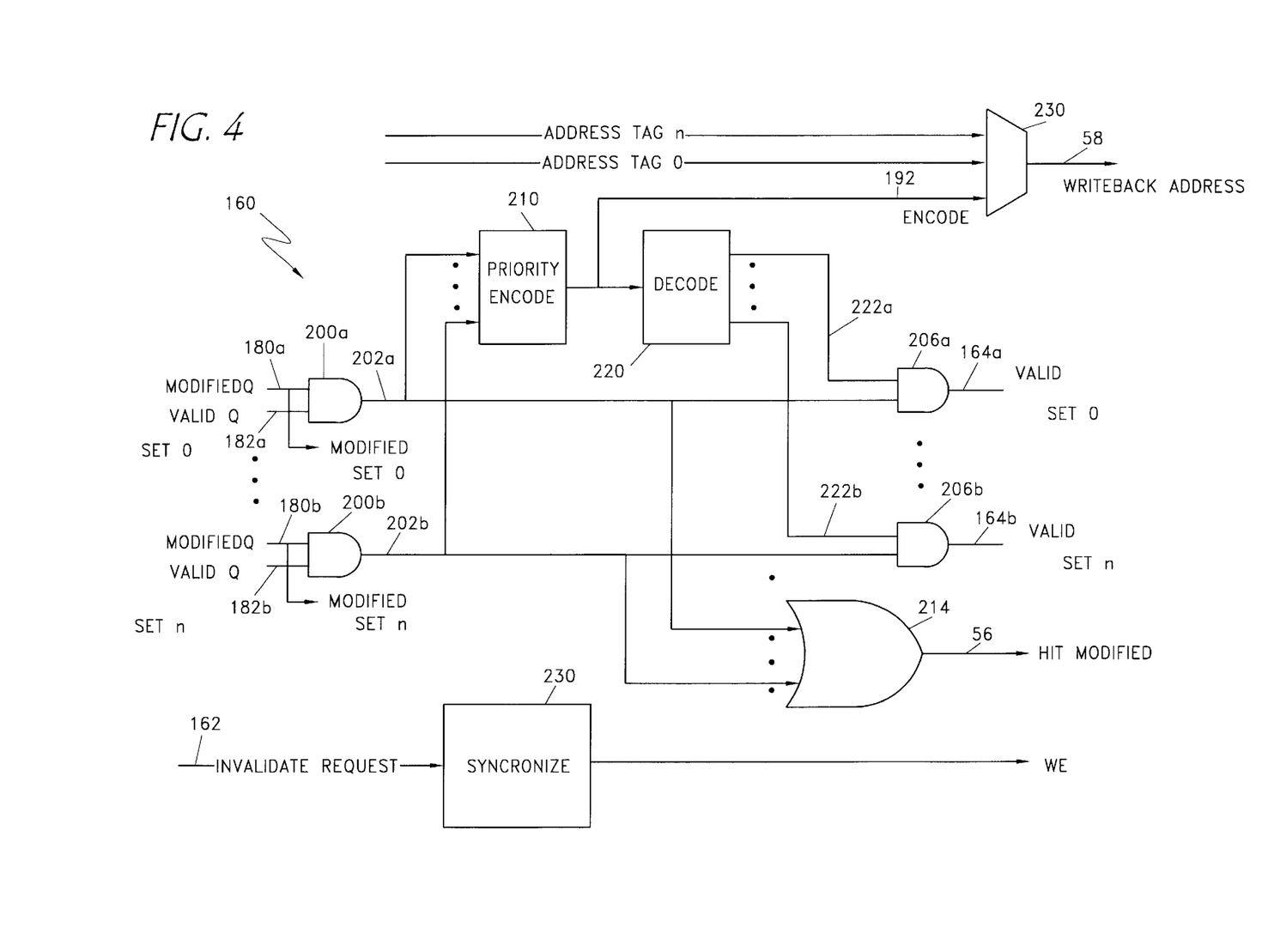
FIG. 4 is a circuit diagram illustrating one embodiment of a mechanism for outputting hit modified, valid and write back address signals in an embodiment of the cache memory invalidation system.

Referring to FIG. 4, a detailed view of the tag update circuit 160 of FIG. 3 is illustrated. The ModifiedQ lines 180a–b and ValidQ lines 182a–b feed into a set of AND gates 200a–b. If the incoming ModifiedQ lines 180 and ValidQ lines 182 are asserted simultaneously, then the output 202a–b of the AND gates 200a–b are asserted. As shown, AND gate outputs 202a–b feed into a second set of AND gates 206a–b and also into a priority encoder 210. In addition, the outputs 202a–b from the AND gates 200a–b are fed into an OR gate 214 such that a HITMODIFIED signal is generated when any of the outputs 202a–b are asserted from the AND gates 200a–b. Thus, asserting a signal on a ModifiedQ line 180 and ValidQ line 182 will lead to an output signal being asserted on the output line 202 of the AND gate 200. In addition, if any signal is generated on one of the output lines 202, a HITMODIFIED signal will be generated on the HitModified line 56.

To select which of the sets in the cache to act upon first, the priority encoder 210 generates a signal on the encode line 192 which is thereafter used to select the first address tag from the currently available set to be output as a write back address 58 to the main memory 46 (FIG. 1). It should be noted that since the inputs of the priority encoder 210 come from the AND gates 200, a signal will only be sent to the priority encoder 210 for sets within the invalidate address that contain both modified and valid bits. Once the priority encoder 210 has selected the first address within the chosen set to invalidate, a signal generated on the encode line 192. The same ENCODE signal is also fed into a decode circuit 220 which decodes the signal and generates an output 222a–b which feeds into a second set of AND gates 206a–b in order to generate a VALID signal on the Valid line 164a–b.

As discussed above, the ENCODE signal that is generated on the encode line 192 from the priority encoder 210 is also connected to a multiplexer 230 so that the encode line 192 can act as a select signal to determine which of the address tags coming from the invalidate state machine 152 along the invalidate address bus 16 (FIG. 3) will be written back to the main memory. The invalidate request line 162 (FIG. 3) is fed into a synchronization circuit 230 so that a WRITE ENABLE signal will be generated along the Write Enable Line 168 at the appropriate time to allow invalidation of each address within the cache tag RAM 30.

Figure 5:
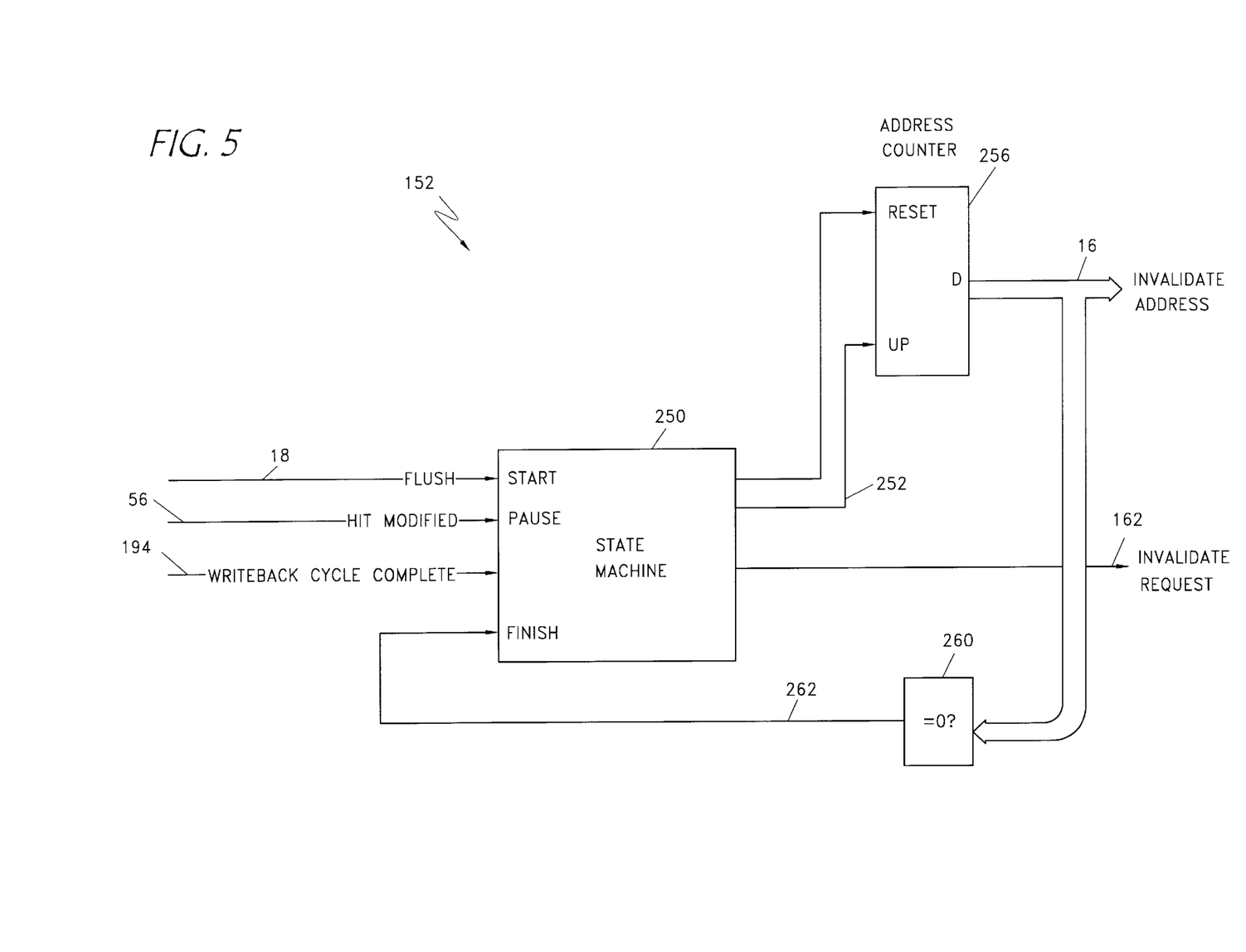
FIG. 5 is a block diagram illustrating one embodiment of a state machine within the cache memory invalidation system.

Referring to FIG. 5, a schematic diagram of the invalidate state machine 152 is shown. The invalidate state machine 152 includes a state machine 250 having inputs from the FLUSH line 18, hit modified line 56 and write back cycle complete line 194. The FLUSH line 18 is used to start the state machine, whereas the hit modified line is used as a pause signal. Once the state machine has been initiated by receiving a FLUSH signal along the FLUSH line 18, an UP signal is generated along the up line 252 to an address counter 256. The address counter begins at the lowest address in the cache tag RAM and outputs an invalidate address onto the address bus 16 as described in FIGS. 1 and 3. In addition, the state machine 250 generates a signal on the invalidate request line 162 to indicate to the tag update circuit 160 that the address currently placed on the address bus 16 is to be invalidated in the cache tag RAM 30.

If the address contains modified and valid data, then as discussed in reference to FIG. 4, a HITMODIFIED signal will be generated along the hit modified line 56. Generating this signal will pause the state machine 250 from outputting additional addresses on the address bus 16. Once the HITMODIFIED signal has been cleared from the hit modified line 56, then the state machine 250 generates an additional UP signal on the up line 252 to cause the address counter 256 to generate the next address to be output on the address bus 16. This cycle continues until the address output on the address bus 16 is calculated at circuit 260 to equal zero. Once the address output on the address bus 16 equals zero, by reference to circuit 260, a FINISH signal will be generated on a finish line 262 indicating to the state machine 250 that every address in the cache tag RAM 30 has been invalidated.

If an address that was put on the address bus 16 contained modified and valid data, then a HITMODIFIED signal is generated on the hit modified line 56 to pause the state machine 250. After the modified data from the cache data RAM has been written back to the main memory, a WRITEBACK COMPLETE signal is generated on the write back cycle complete line 194 to indicate to the state machine 250 that it can continue its process.

Figure 6:
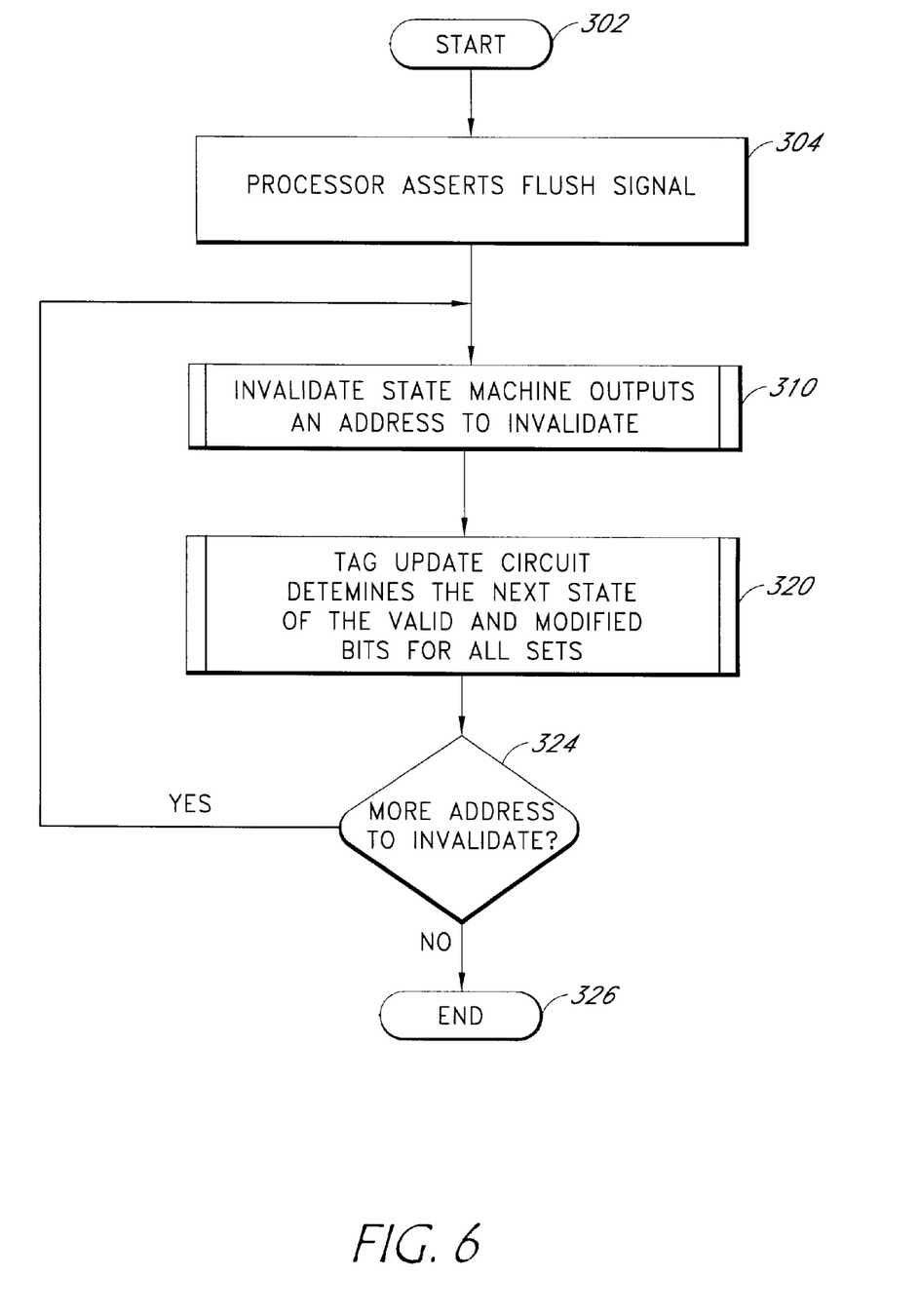
FIG. 6 is a flow diagram illustrating an overview of the method of the invention for asserting a processor flush signal and thereafter invalidating tag addresses.

FIG. 6 is a flow diagram that illustrates an overview of the process 300 which is running within the tag update circuit 160 and invalidate state machine 152 of the tag invalidation system. The process 300 begins at a start state 302 and thereafter moves to state 304 wherein the processor asserts a FLUSH signal. Once the FLUSH signal has been asserted, the invalidate state machine 152 outputs an address to invalidate on the address bus at a process state 310. The process state 310 will be discussed in more detail in reference to FIG. 7 below. Once the invalidate state machine has output an address to invalidate at process state 310, the tag update circuit determines the next state of the valid and modified bits for all sets at the invalidate address within the cache tag RAM at a process 320. By simultaneously deciding the state of the valid and modified bits for all sets at the invalidate address, the tag update circuit 160 can output signals corresponding to the status of each of these bits. As described with reference to FIG. 4, the status of the modified and valid bits for each set determines which address in the cache tag RAM 30 has corresponding data requiring a write back to the main memory.

After the tag update circuit has decided the next state of the valid and modified bits for each set of the invalidated address, the process 300 moves to state 324 wherein a decision is made whether more addresses need to be invalidated by the state machine. If more addresses do need to be invalidated, the process 300 loops to process 310 wherein the invalidate state machine outputs the next address to invalidate. However, if no more addresses require invalidation, as would be the case if all addresses had already been invalidated, the process 300 moves to an end state 326 and completes.

Figure 7:
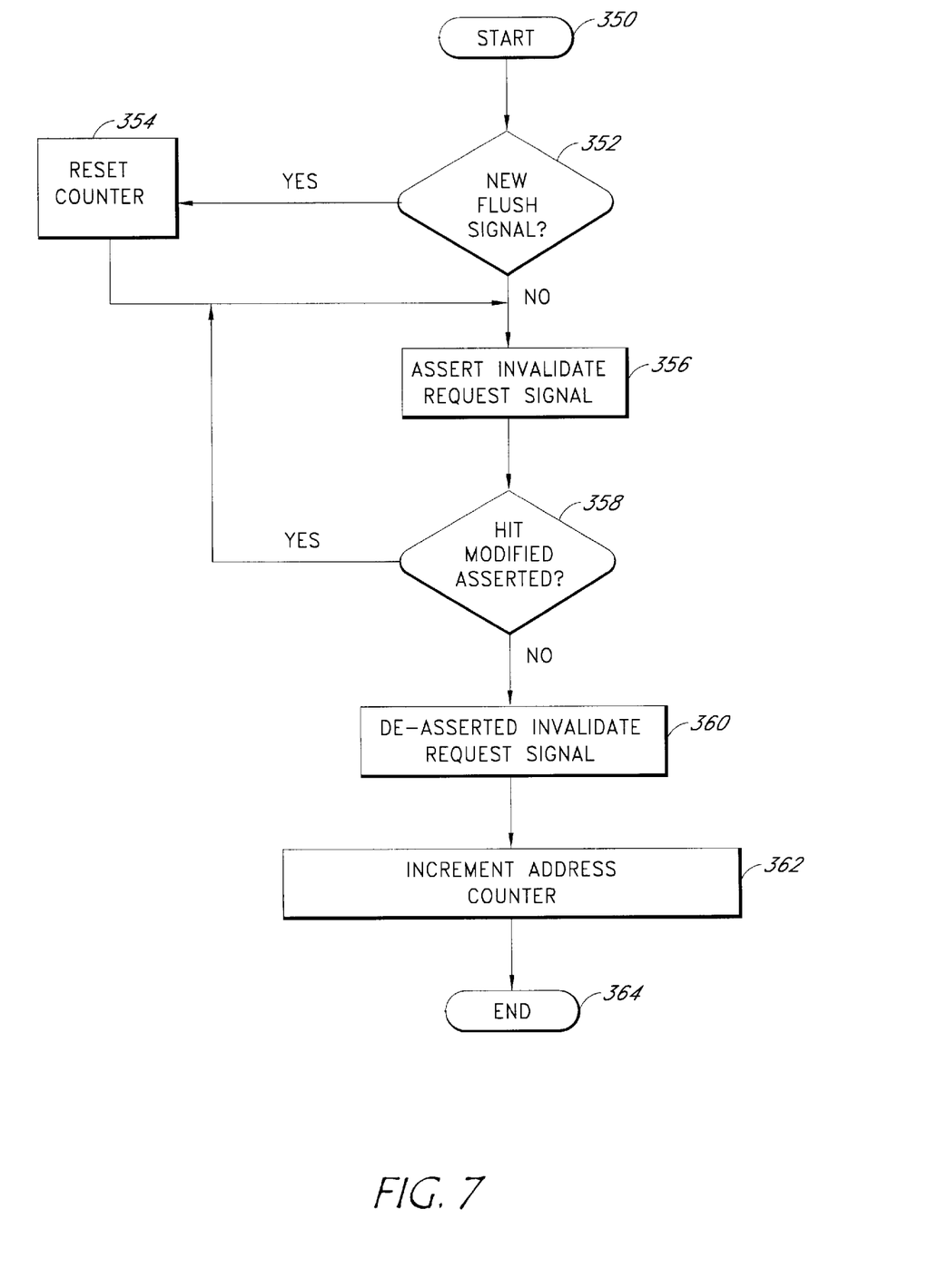
FIG. 7 is a flow diagram illustrating the "state machine outputs address to invalidate" process of FIG. 6.

Referring now to FIG. 7, the process of outputting an address to invalidate from the invalidate state machine 310 is described in more detail. The process 310 begins at a start state 350 and then moves to a decision state 352 wherein a determination is made whether the FLUSH signal that was asserted by the processor 12 is a new FLUSH signal or already had existed in prior clock cycles. If the FLUSH signal is new at the decision state 352 then the process 310 moves to state 354 wherein a counter within the invalidate state machine is reset. After the counter is reset at state 354, then the process 310 moves to state 356 wherein the INVALIDATE REQUEST signal is asserted along the invalidate request line 162. If the FLUSH signal was not new at decision state 352, then the process 310 skips state 354 and moves directly to state 356 wherein the INVALIDATE REQUEST signal is asserted.

Once the INVALIDATE REQUEST signal has been asserted by the invalidate state machine 152, the process 310 moves to a decision state 358 wherein a determination is made whether the HIT MODIFIED signal has also been asserted along the hit modified line 56. If HIT MODIFIED signal has been asserted at decision state 358, then the process 310 loops to state 356 and maintains assertion of the INVALIDATE REQUEST signal. This feedback circuit maintains the status of the INVALIDATE REQUEST signal as long as the HIT MODIFIED signal is asserted. However, once the HIT MODIFIED signal is no longer asserted at decision state 358, the INVALIDATE REQUEST signal is de-asserted at a state 360.

Therefore, as described above, the process 310 remains in a loop as the hit modified signal is asserted. Once hit modified signal has been de-asserted, the process de-asserts the invalidate request signal at state 360. Once the invalidate request signal has been de-asserted at state 360, the process 310 moves to state 362 wherein the address counter within the invalidate state machine 152 is incremented to the next address. The process 310 then terminates at an end state 364.

Figure 8:
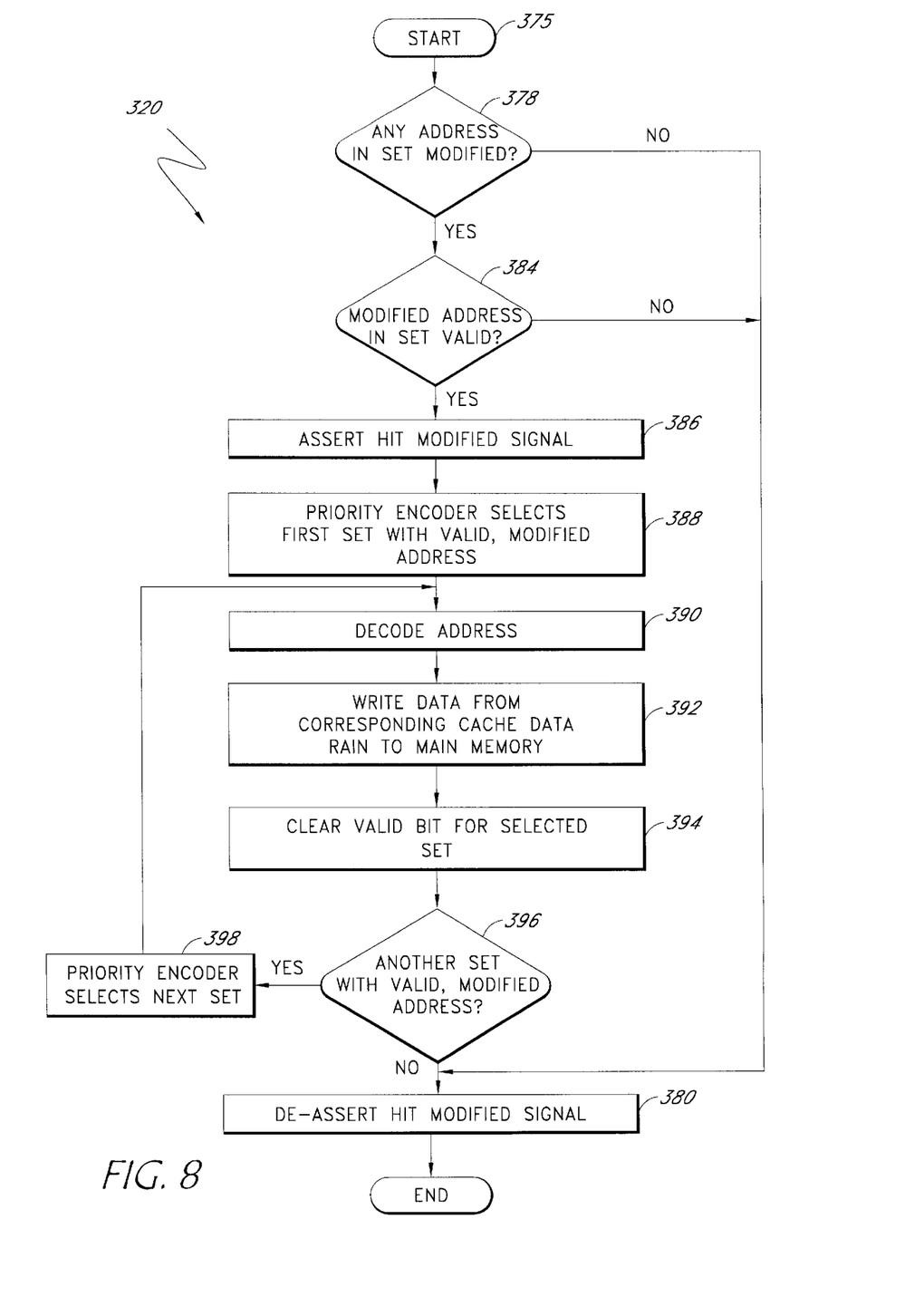
FIG. 8 is a flow diagram illustrating the "tag update circuit determines the next state of the valid and modified bits for all sets" process of FIG. 6.

Referring to FIG. 8, a description of the process 320 (FIG. 6) that the tag update circuit undertakes to determine the next state of the valid and modified bits for all sets at the invalidate address is described in more detail. The process 320 begins at a start state 375 and then moves to a decision state 378 wherein a determination is made whether any address in the set is modified. As discussed in relation to FIG. 6, an invalidate address is sent to the tag update circuit to determine whether any set within that address contains valid, modified data. Thus, at this decision state, the process 320 is analyzing whether any set from the invalidate address submitted by the invalidate state machine at process 310 includes modified data. This determination can be made by analyzing the modified bit for each set corresponding to the invalidate address. If no sets corresponding to the invalidate address were modified at decision state 378, then the process 320 moves to state 380 wherein the hit modified signal is de-asserted.

If any set corresponding to the invalidate address did contain a modified bit at decision state 378, the process 320 determines whether the modified address in the first set is valid at a decision state 384. If the modified address in the set is not valid, then the process 320 moves to state 380 wherein the HIT MODIFIED signal is de-asserted. However, if the modified address at decision state 384, the process 320 moves to state 386 wherein the HIT MODIFIED signal is asserted. As discussed in relation to FIG. 3, the HIT MODIFIED signal indicates to the tag update circuit that the current invalidate address contains data that needs to be written back to the main memory. The process 320 then moves to state 388 wherein the priority encoder 210 (FIG. 4) selects the first set in the cache memory with a valid, modified address. The priority encoder then decodes the selected address at a state 390 and writes data from the corresponding cache data RAM to the main memory at a state 392.

Once the data has been written back from the corresponding cache data RAM to the main memory at state 392, the valid bit for the selected set is cleared at state 394. Thus, this set is no longer marked as containing valid data. Once the valid bit is cleared at state 394, an inquiry is made at a decision state 396 whether another set within the modified address contains valid, modified data. If another set does contain valid, modified data at decision state 396 then the priority encoder selects the next set to be written back at state 398. The process 320 then moves to state 390 wherein the next selected address is decoded.

If another set with valid, modified data is not found at the decision state 396, then the process 320 moves to state 380 wherein the hit modified signal is de-asserted. The process 320 then ends at an end state 400.

The cache invalidation system described above overcomes many of the longstanding problems with prior systems. As described above, this system simultaneously invalidates each set within a muti-set associative cache memory. During a FLUSH cycle, prior systems would invalidate every address individually and thereby require a comparatively long period of time to complete. The system described herein is much more efficient because it can simultaneously invalidate every address within each cache memory set. Thus, computer systems implementing this system will perform more efficiently.

The invention may be embodied in other specific forms without departing from its spirit or essential characteristics. The described embodiment is to be considered in all respects only as illustrative an not restrictive and the scope of the invention is, therefore, indicated by the appended claims rather than by the foregoing descriptions. All charges which come within the meaning and range of equivalency of the claims are to be embraced within their scope.

What is claimed is:

1. A set-associative cache memory system for use in communication with a computer processor and main memory and adapted to efficiently invalidate data stored in the cache data memory of the system comprising:

a cache data memory;

a cache tag memory configured to store the address and status of all data stored in said cache data memory;

a counter in communication with said cache tag memory for serially outputting all the addresses to be invalidated in said cache tag memory;

a plurality of parallel first logic circuits in communication with said cache tag memory and configured to generate a signal indicating whether each selected invalidate address from said counter contains modified and valid data;

a priority encoder responsive to said plurality of first logic circuits for generating an encode signal used for selecting an address to act upon first among said all the addresses;

a multiplexer responsive to said encode signal for selecting on the address to be output as a write back address to said main memory;

a decode circuit for decoding said encode signal and outputting a decoded signal; and a synchronization circuit in communication with said cache tag memory responsive to an invalidate request for generating Write Enable signal that allows invalidation of each address within the cache tag memory.

2. The system of claim 1, further comprising a second logic circuit responsive to said plurality of first logic circuits for writing data from said address in the cache data memory to said main memory.

3. The system of claim 1, wherein said counter outputs said address in response to a FLUSH signal from an Intel® Pentium® processor.

4. The system of claim 1, wherein said set-associative cache memory is a two-way set associative cache memory.

5. The system of claim 1, further comprising a third logic circuit for outputting a HIT MODIFIED signal that is asserted when said address contains data that has not been written back to said main memory.

6. The system of claim 1, wherein said counter can be incremented to a next address to invalidate.

7. The system of claim 6, wherein said counter is in communication with a write-back signal indicative of a previous write-back cycle being complete, and wherein said counter is incremented to a next address to invalidate upon receiving said write-back signal.

8. In a computer system having a set-associative cache memory and a main memory, a process for invalidating all addresses in said cache memory, comprising the acts of:

serially outputting all the addresses of the cache memory;

outputting respectively a first logic gate signal indicating whether each selected invalidate address contains modified and valid bits;

generating an encode signal used for selecting an address to act upon first among said all the addresses responsive to said first logic gate signal;

selecting the first address among said all the addresses to be output as a write back address to said main memory responsive to said encode signal;

decoding said encode signal and outputting a decoded signal;

outputting respectively a valid signal responsive to said corresponding first logic gate signal and said corresponding decoded signal;

outputting a Hit Modified signal indicating that the address stored in said cache memory has been modified and not written back to said main memory responsive to said first logic gate signal; and generating a Write Enable signal that allows invalidation of each address within the cache memory responsive to an invalidate request.

9. The process of claim 8, wherein said outputting all the addresses act includes outputting addresses to a two-way set associative cache memory.

\* \* \* \* \*